(12) United States Patent
Kato et al.

(10) Patent No.: US 7,603,027 B2
(45) Date of Patent: Oct. 13, 2009

(54) INFORMATION RECORDING MEDIUM, INFORMATION RECORDING DEVICE AND METHOD, INFORMATION RECORDING/REPRODUCING DEVICE AND METHOD, AND COMPUTER PROGRAM

(75) Inventors: Masahiro Kato, Tokorozawa (JP); Shoji Taniguchi, Tokorozawa (JP); Eiji Muramatsu, Tokorozawa (JP); Kunihiko Horikawa, Tokorozawa (JP); Toshio Suzuki, Tokorozawa (JP); Kazuo Kuroda, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/574,354

(22) PCT Filed: Sep. 28, 2004

(86) PCT No.: PCT/JP2004/014151

§ 371 (c)(1),
(2), (4) Date: Aug. 12, 2008

(87) PCT Pub. No.: WO2005/034109

PCT Pub. Date: Apr. 14, 2005

(65) Prior Publication Data

US 2008/0292284 A1 Nov. 27, 2008

(30) Foreign Application Priority Data

Oct. 3, 2003 (JP) ............................. 2003-346064

(51) Int. Cl.
*H04N 5/00* (2006.01)
(52) U.S. Cl. ...................................... 386/126; 386/125
(58) Field of Classification Search ................ 386/125, 386/126, 46, 45, 21, 113, 124
See application file for complete search history.

(56) References Cited

U.S. PATENT DOCUMENTS

2003/0036861 A1* 2/2003 Matsumoto ................. 702/60
2004/0145978 A1* 7/2004 Yamamoto ............... 369/44.32

FOREIGN PATENT DOCUMENTS

| JP | 10-283656 | 10/1998 |
| JP | 2000-504467 | 4/2000 |
| JP | 2002-208139 | 7/2002 |
| JP | 2002-373421 | 12/2002 |
| JP | 2003-085760 A * | 3/2003 |

* cited by examiner

*Primary Examiner*—Robert Chevalier
(74) *Attorney, Agent, or Firm*—Young & Thompson

(57) ABSTRACT

An information recording apparatus (1) is provided with: a recording device (310) for recording record information onto an information recording medium by irradiating the information recording medium (100) with laser light with a recording power according to a set value; a calculating device (340) for preparing correlation information which represents a correlation between the set value and reproduction quality, and for obtaining a reference set value which gives target reproduction quality as being desired reproduction quality, by reproducing test-record information recorded with changing the set value on the recording device; a measuring device (330) for measuring the reproduction quality, by reproducing the record information recorded by using the reference set value on the recording device; and an adjusting device (400) for obtaining adjustment amount of the reference set value on the basis of the correlation information if the reproduction quality measured by the measuring device is different from the target reproduction quality, and for adjusting the reference set value such that a set value which is adjusted based on the adjustment amount is to be a new reference set value.

14 Claims, 10 Drawing Sheets

| Recording power | Asymmetry |
|---|---|
| 12.3 | −0.104 |
| 13.0 | −0.027 |
| 13.6 | 0.029 |
| 14.3 | 0.076 |
| 14.8 | 0.106 |
| 15.4 | 0.135 |
| 15.9 | 0.146 |

INFORMATION RECORDING MEDIUM, INFORMATION RECORDING DEVICE AND METHOD, INFORMATION RECORDING/REPRODUCING DEVICE AND METHOD, AND COMPUTER PROGRAM

TECHNICAL FIELD

The present invention relates to an information recording apparatus, such as a DVD recorder, an information recording method, an information recording/reproducing apparatus, an information recording/reproducing method, and a computer program which makes a computer function as the information recording apparatus or the information recording/reproducing apparatus.

BACKGROUND ART

On an information recording/reproducing apparatus for recording information onto an information recording medium, such as an optical disc, for example, the optimum power of a recording power is set by an OPC (Optimum Power Calibration) process, depending on the type of the optical disc, the type the information recording/reproducing apparatus, recording speed and so on. That is, the calibration of the recording power is performed. By this, it is possible to realize an appropriate recording operation. For example, if the optical disc is loaded and a writing command is inputted, data for test writing is recorded into a power calibration area, with sequentially changing the light intensity, so that a so-called test writing process is performed. Then, the data for test writing recorded in this manner is reproduced, and this reproduction result is judged by a predetermined estimation standard, to thereby set the optimum power. Moreover, on an information recording apparatus disclosed in a patent document 1, the recording power obtained by the OPC is adjusted on the basis of reproduction quality which is obtained by the reproduction of actually recorded data.

Patent document 1: Japanese Patent Application Laying Open NO. 2001-297439

DISCLOSURE OF INVENTION

Object to be Solved by the Invention

However, in the above-mentioned OPC, the calibration of the recording power is performed in the power calibration area which is set in advance on the optical disc. The power calibration area is generally disposed on the most inner circumferential side or the most outer circumferential side on the optical disc, for example. On the other hand, in the optical disc or the like, recording characteristics in a recording surface are not always uniform, because of a difference in the production condition and the production method thereof. Moreover, it is known that even the temperature characteristics or the like of recording laser likely cause the recording power to be changed. Therefore, there is such a technical problem that even if the calibration of the recording power is performed in the power calibration area, the optimum recording power obtained is not always appropriate throughout the entire optical disc. Moreover, even if a linear velocity is changed, there is such a technical problem that the optimum recording power after the change of the liner velocity and the optimum recording power before the change of the liner velocity are mutually different. Moreover, even if the recording power is adjusted on the basis of the reproduction quality of the data, it cannot be always insisted that a power value obtained is optimum due to a variation in the recording characteristics and its changing tendency. Moreover, in the above-mentioned patent document 1, there is also such a technical problem that it is necessary to record the data into a target recording area in order to adjust the recording power, so that it is difficult or impossible to adjust the recording power in a recording area where the data is not recorded.

In order to solve the above-mentioned conventional problems, it is therefore an object of the present invention to provide an information recording apparatus, an information recording method, an information recording/reproducing apparatus, and an information recording/reproducing method, which enable information to be recorded with an appropriate recording power onto an information recording medium, such as an optical disc, as well as a computer program which makes a computer function as the information recording apparatus.

Means for Solving the Object

In order to solve the above object, an information recording apparatus of the present invention is provided with: a recording device for recording record information onto an information recording medium by irradiating the information recording medium with laser light with a recording power according to a set value; a calculating device for preparing correlation information which represents a correlation between the set value and reproduction quality and for obtaining a reference set value which gives desired reproduction quality (target reproduction quality), by reproducing test-record information recorded with changing the set value on the recording device; a measuring device for measuring the reproduction quality, by reproducing the record information recorded by using the reference set value on the recording device; and an adjusting device for obtaining adjustment amount of the reference set value on the basis of the correlation information if the reproduction quality measured by the measuring device is different from the target reproduction quality, and for adjusting the reference set value such that a set value which is adjusted based on the adjustment amount is to be a new reference set value.

In order to solve the above object, an information recording method of the present invention is provided with: a recording process of recording record information onto an information recording medium by irradiating the information recording medium with laser light with a recording power according to a set value; a calculating process of preparing correlation information which represents a correlation between the set value and reproduction quality and of obtaining a reference set value which gives desired reproduction quality (target reproduction quality), by reproducing test-record information recorded with changing the set value in the recording process; a measuring process of measuring the reproduction quality, by reproducing the record information recorded by using the reference set value in the recording process; and an adjusting process of obtaining adjustment amount of the reference set value on the basis of the correlation information if the reproduction quality measured in the measuring process is different from the target reproduction quality, and of adjusting the reference set value such that a set value which is adjusted based on the adjustment amount is to be a new reference set value.

In order to solve the above object, an information recording/reproducing apparatus of the present invention is provided with: the information recording apparatus of the present invention; and a reproducing device for reproducing the recorded information from the information recording apparatus.

In order to solve the above object, an information recording/reproducing method of the present invention is provided with: the information recording method of the present invention; and a reproducing process of reproducing the recorded information from the information recording apparatus.

In order to solve the above object, a first computer program of the present invention is a computer program for record control to control a computer provided for the information recording apparatus of the present invention, the computer program making the computer function as at least one portion of the recording device, the calculating detecting device, the measuring device and the adjusting device.

In order to solve the above object, a second computer program of the present invention is a computer program for record/reproduction control to control a computer provided for the information recording/reproducing apparatus of the present invention, the computer program making the computer function as at least one portion of the recording device, the calculating detecting device, the measuring device, the adjusting device and the reproducing device.

Effects and other advantages of the present invention become more apparent from the following embodiments.

DESCRIPTION OF REFERENCE CODES

Figure 1:
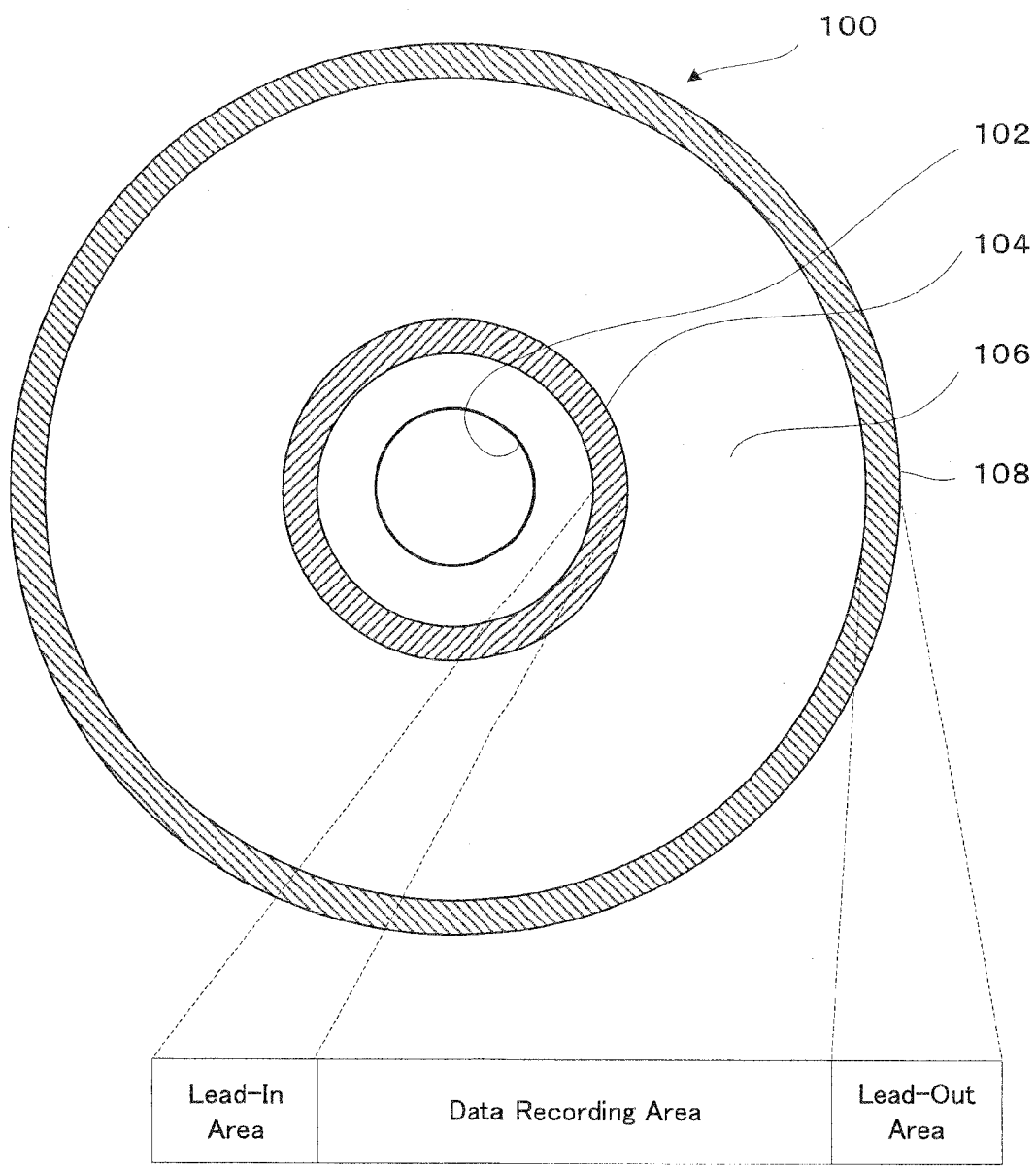
FIG. 1 shows the basic structure of an optical disc as being one example of the information recording medium which is used for an example of the information recording apparatus of the present invention, wherein the upper part is a substantial plan view showing the optical disc having a plurality of areas.

1 Information recording apparatus
100 Optical disc
104 Lead-in area
106 Data recording area
108 Lead-out area
310 Optical pickup
312 RF detector
315 Servo unit
320 LD driver
330 Envelope detector
340 OPC pattern generator
400 CPU
401 Memory

BEST MODE FOR CARRYING OUT THE INVENTION

Hereinafter, an explanation will be sequentially given to an information recording medium, an information recording apparatus, an information recording method, and a computer program according to embodiments of the present invention, as being a best mode for carrying out the invention.

Embodiment of Information Recording Apparatus

An embodiment of the information recording apparatus in the present invention is provided with: a recording device for recording record information onto an information recording medium by irradiating the information recording medium with laser light with a recording power according to a set value; a calculating device for preparing correlation information which represents a correlation between the set value and reproduction quality and for obtaining a reference set value which gives desired reproduction quality (target reproduction quality), by reproducing test-record information recorded with changing the set value on the recording device; a measuring device for measuring the reproduction quality, by reproducing the record information recorded by using the reference set value on the recording device; and an adjusting device for obtaining adjustment amount of the reference set value on the basis of the correlation information if the reproduction quality measured by the measuring device is different from the target reproduction quality, and for adjusting the reference set value such that a set value which is adjusted based on the adjustment amount is to be a new reference set value.

According to the embodiment of the information recording apparatus in the present invention, it is possible to record various record information, which includes contents, such as video information and music information, or data information for a computer or the like, for example, by the operation of the recording device. Then, as the value of the recording power at the time of this recording operation (i.e. the set value), the reference set value obtained by the calculating device is used. Specifically, the calculating device reproduces the test-record information (e.g. an OPC pattern described later) recorded with changing the set value (i.e. with changing the recording power, as occasion demands), to thereby obtain the reference set value which gives the desired reproduction quality. Here, the target reproduction quality as being the desired reproduction quality may be reproduction quality which minimizes an asymmetry value, as described later, or may be reproduction quality which minimizes a jitter value, a reproduction error rate, or the like.

Particularly in the embodiment, in obtaining the reference set value of the recording power, the calculating device also obtains the correlation information which indicates a correlation relationship between the set value of the recording power and the reproduction quality of the record information (e.g. the test-record information) recorded with the recording power according to the set value. With regard to this correlation information, the reproduction quality may be shown as a function of the set value, or it may be shown as a corresponding list (e.g. a list showing specific numerical values), or may be shown by other various graphs, lists, function, or the like. Then, the measuring device is constructed to measure the reproduction quality of the record information recorded by the recording device. Then, if the reproduction quality measured by the measuring device and the target reproduction quality are different, the adjustment amount of the reference set value is obtained by the operation of the adjusting device. Namely, the adjustment amount which indicates a difference between the set value of the recording power which gives the target reproduction quality and the reference set value obtained by the calculating device is obtained. If the recording power is adjusted in accordance with the adjustment amount obtained by the adjusting device, the recording device can record the record information with a more preferable recording power. Then, the adjusting device may control the recording device to adjust the recording power in accordance with the adjustment amount. Alternatively, the recording device may emit the laser light with a new reference set value, while adjusting the recording power in accordance with the adjustment amount obtained by the adjusting device.

At this time, the reference set value obtained by the calculating device is adjusted such that the set value into which the adjustment amount obtained by the adjusting device is reflected is a new reference set value. Along with the adjustment of the reference set value, the recording power of the laser light is also adjusted. Then, subsequent various operations are performed by using the new reference set value (i.e. the reference set value adjusted by the adjusting device). Namely, the adjustment amount which will be obtained afterward is preferably a difference between the new reference set value obtained and the set value which gives the target reproduction quality. Incidentally, the adjusting device may obtain the adjustment amount which is a difference between the reference set value obtained by the calculating device and the set value which gives the target reproduction quality. This is just a difference in whether to obtain an absolute adjustment amount on the basis of an absolute numerical value which is the reference set value obtained by the calculating device, or to obtain a relative adjustment amount in which the reference set value sequentially changes. This indicates both operations of obtaining the adjustment amount are equivalent in the point that the adjustment amount is obtained in order to obtain the set value of the recording power which gives the target reproduction quality.

In particular, the reference set value can be adjusted by using not only the reference set value of the recording power, but also using the correlation information which indicates the relationship between the set value of the recording power and the reproduction quality, so that it is possible to obtain the adjustment amount of the recording power which can give higher reproduction quality (or target reproduction quality), relatively easily. In other words, it can be said that the present invention has a more excellent effect than the invention described in the patent document 1 or the like, for example, in the point that it is possible to obtain the adjustment amount of the recording power which gives the target reproduction quality, on the basis of a tendency in the change of the recording power indicated by the correlation information. The operation of obtaining the adjustment amount according to the correlation information will be explained in more detail in Example described later.

Consequently, according to the embodiment of the information recording apparatus of the present invention, by effectively using the correlation information, it is possible to obtain the set value of the recording power which can realize the desired target reproduction quality. Therefore, it is possible to record the record information with the appropriate recording power, and as a result, upon the reproduction of the record information, it is possible to prevent the occurrence of a reproduction error. Thus, the reproduction quality can be more improved.

In another aspect of the embodiment of the information recording apparatus in the present invention, the adjusting device adjusts the reference set value, by a predetermined adjustment amount, in stages.

According to this aspect, without changing the recording power, rapidly or immediately, from the reference set value to the set value which is adjusted, the adjustment of the recording power (i.e. the degree of the change) may be mildly performed such that the recording power approaches the set value which is adjusted in stages. Therefore, it is possible to prevent the situation that the recoding state of the record information (e.g. an asymmetry value, etc.) is suddenly greatly changed due to a rapid change of the recording power. As a result, it is possible to prevent various disadvantages (e.g. a reading error upon reproduction, or the like, as described later) which are likely caused by the rapid change of the recording power. By this, there is such a great advantage that it is possible to realize the appropriate reproduction of the record information by an information reproducing apparatus.

Incidentally, it is preferable that the size of the predetermined adjust amount added in stages can be changed, as occasion demands, in accordance with the mildness of the change of the recording power, caused by the adjustment. However, a predetermined size may be determined in advance.

In an aspect of the information recording apparatus in which the reference set value is adjusted in stages, as described above, size of the predetermined adjustment amount is variable.

By virtue of such construction, it is possible to set the degree of the change of the recording power, as occasion demands. For example, if the predetermined adjustment amount is set to be relatively small, the change of the recording power is relatively mild. On the other hand, if the predetermined adjustment amount is set to be relatively large, the change of the recording power is relatively rapid or sudden.

At this time, the embodiment of the information recording apparatus of the present invention may be provided with a first judging device for judging whether or not the adjusting device adjusts the reference set value in stages.

By virtue of such construction, in accordance with the judgment of the first judging device, it is possible to adjust the recording power in stages, or adjust the recording power, immediately, for example. Thus, it is possible to prevent that the recording power is unnecessarily adjusted in stages. This increases the record information recorded with the recording power which can realize the target reproduction quality, so that it is possible to realize a more preferable recording operation.

In another aspect of the embodiment of the information recording apparatus in the present invention, the adjusting device does not adjust the reference set value if the adjustment amount of the reference set value is equal to or less than a predetermined amount.

According to this aspect, if the adjustment amount obtained by the adjusting device is equal to or less than the predetermined amount, for example, the reference set value before the adjustment is maintained (i.e. the reference set value is not adjusted). Then, if the adjustment amount is equal to or greater than the predetermined amount, the set value after the adjustment is set as a new reference set value. Thus, by appropriately setting the predetermined amount, the adjustment amount obtained by the adjusting device is gradually reduced, and it is possible to judge that it converges to a more appropriate reference set value. Therefore, there is no need to adjust the reference set value beyond necessity, and it is possible to improve the processing performance of the recording operation. Incidentally, the operation of determining whether or not to adjust on the basis of the size of the adjustment amount will be explained in detail in Example described later.

In another aspect of the embodiment of the information recording apparatus in the present invention, the adjusting device adjusts the reference set value every time the recording device records a predetermined amount of record information or in each predetermined time length.

According to this aspect, the adjustment amount can be obtained in each predetermined period. Thus, in any recording position of the information recording medium, it is possible to record the record information, preferably. Or, in the case in which the recording operation is continued, it is possible to record the record information, preferably. Incidentally, numerical values related to the "predetermined amount of record information" and the "predetermined time length" may be determined in advance, for example, or may be changed, as occasion demands, during the recording of the record information. If it is changed, it may be changed by a user of the information recording apparatus, or may be automatically changed by the operation of a CPU or the like.

At this time, the adjusting device may obtain the adjustment amount every time a position where the recording device records the record information is changed by a predetermined amount on the information recording medium.

By virtue of such construction, in any position on the information recording medium, it is possible to appropriately record the record information with the recording power related to an optimum value. For example, in the case of a disc-shaped information recording medium, such as an optical disc, like a CD and a DVD or the like, as the recording position is displaced, starting from near the inner circumference, through near the middle circumference, and to near the outer circumference, the adjustment amount can be obtained, as occasion demands. Therefore, in response to a change of the reference set value caused by inconsistent sensitivity or the like, it is possible to record the record information with a more preferable recording power.

In another aspect of the embodiment of the information recording apparatus in the present invention, the reproduction quality is reproduction quality including at least one of an asymmetry value, a jitter value and a reproduction error rate.

According to this aspect, it is possible to accurately obtain the adjustment amount to realize the more appropriate recording operation. For example, as the target reproduction value, it may be reproduction quality which minimizes the asymmetry value, as described later, or may be reproduction quality which minimizes the jitter value. Alternatively, it may be reproduction quality which minimizes the reproduction error rate. Then, by combining the reproduction qualities, as occasion demands, the adjustment amount may be obtained. Alternatively, by preferentially judging or determining any one of the reproduction qualities, the adjustment amount may be obtained.

In another aspect of the embodiment of the information recording apparatus in the present invention, the measuring device measures the reproduction quality of the record information recorded by the recording device immediately before measurement.

According to this aspect, by comparing with the reproduction quality of the record information recorded immediately before the measurement with the recording power related to the reference set value (or the recording power adjusted once), it is possible to obtain a more preferable adjustment amount. Here, the term "immediately before" in the present invention is a wide concept not only indicating its literal meaning but also including a situation in which a period which can be equated with "immediately before" elapses. Therefore, it is possible to record the record information, with the recording power obtained by a more preferable reference set value.

In another aspect of the embodiment of the information recording apparatus in the present invention, it is further provided with a controlling device for controlling the recording device to record at least one of the correlation information obtained by the calculating device and information as for the reference set value, onto the information recording medium.

According to this aspect, there is such a great advantage that by recording the above information onto the information recording medium, it is possible to obtain the appropriate adjustment amount not only on the information recording apparatus which actually obtains the reference set value and the correlation information, but also on another information recording apparatus (e.g. an information recording apparatus which has not recorded the record information onto the information recording medium, or the like) by referring to the correlation information or the like recorded on the information recording medium.

At this time, the embodiment of the information recording apparatus of the present invention may be provided with a storing device for storing therein at least one of the information as for the reference set value and the correlation information obtained by the calculating device.

By virtue of such construction, it saves the trouble of sequentially preparing the correlation information. If the correlation is obtained when the information recording medium is loaded, for example, after that, the optimum value can be obtained on the basis of the correlation information stored in the storing device including a semiconductor memory, such as a RAM, and other recording media.

Embodiment of Information Recording Method

An embodiment of the information recording method in the present invention is provided with an information recording method provided with: a recording process of recording record information onto an information recording medium by irradiating the information recording medium with laser light with a recording power according to a set value; a calculating process of preparing correlation information which represents a correlation between the set value and reproduction quality and of obtaining a reference set value which gives target reproduction quality as being desired reproduction quality, by reproducing test-record information recorded with changing the set value in the recording process; a measuring process of measuring the reproduction quality, by reproducing the record information recorded by using the reference set value in the recording process; and an adjusting process of obtaining adjustment amount of the reference set value on the basis of the correlation information if the reproduction quality measured in the measuring process is different from the target reproduction quality, and of adjusting the reference set value such that a set value which is adjusted based on the adjustment amount is to be a new reference set value.

According to the embodiment of the information recording method in the present invention, as in the embodiment of the information recording apparatus in the present invention, it is possible to obtain the reference set value and the correlation information in the calculating process. Then, in the measuring process, it is possible to measure the reproduction quality of the record information recorded. Then, in the adjusting process, it is possible to obtain the adjustment amount by using the correlation information. As a result, in the recording process, it is possible to record the record information with a more preferable recording power (i.e. related to the adjusted reference set value). Therefore, it is possible to receive the various benefits owned by the above-mentioned embodiment of the information recording apparatus in the present invention.

Incidentally, in response to the various aspects of the above-mentioned embodiment of the information recording apparatus in the present invention, the embodiment of the information recording method in the present invention can also adopt various aspects.

Embodiment of Information Recording/Reproducing Apparatus

An embodiment of the information recording/reproducing apparatus in the present invention is provided with: the above-mentioned embodiment according to the information recording apparatus of the present invention (including its various aspects); and a reproducing device for reproducing the recorded information from the information recording apparatus.

According to the embodiment of the information recording/reproducing apparatus in the present invention, it is possible to receive the various benefits owned by the above-mentioned embodiment of the information recording apparatus in the present invention, and it is possible to reproduce the information by using the reproducing device which is provided with an optical pickup, a RF detector, or the like.

Incidentally, in response to the various aspects of the above-mentioned embodiment of the information recording apparatus in the present invention, the embodiment of the information recording/reproducing apparatus in the present invention can also adopt various aspects.

An embodiment of the information recording/reproducing method in the present invention is provided with: the above-mentioned embodiment of the information recording method of the present invention (including its various aspects); and a reproducing process of reproducing the recorded information from the information recording apparatus.

According to the embodiment of the information recording/reproducing method in the present invention, it is possible to receive the various benefits owned by the above-mentioned embodiment of the information recording method in the present invention, and it is possible to reproduce the information, in the reproducing process performed by the operation of an optical pickup, a RF detector, or the like.

Incidentally, in response to the various aspects of the above-mentioned embodiment of the information recording method in the present invention, the embodiment of the information recording/reproducing method in the present invention can also adopt various aspects.

Embodiment of Computer Program

A first embodiment of the computer program in the present invention makes a computer function as the above-mentioned embodiment of the information recording apparatus (including its various aspects). More specifically, it makes the computer function as at least one portion of the recording device, the calculating device, the measuring device, and the adjusting device.

According to the first embodiment of the computer program in the present invention, the above-mentioned embodiment of the information recording apparatus in the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the above-mentioned embodiment of the information recording apparatus in the present invention, the first embodiment of the computer program in the present invention can also adopt various aspects.

A second embodiment of the computer program in the present invention makes a computer function as the above-mentioned embodiment of the information recording/reproducing apparatus (including its various aspects). More specifically, it makes the computer function as at least one portion of the information recording apparatus and the reproducing device.

According to the second embodiment of the computer program in the present invention, the above-mentioned embodiment of the information recording/reproducing apparatus in the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the above-mentioned embodiment of the information recording/reproducing apparatus in the present invention, the second embodiment of the computer program in the present invention can also adopt various aspects.

The above object of the present invention can be also achieved by a first embodiment of a computer program product in a computer-readable medium for tangibly embodying a program of instructions executable by a computer, to make the computer function as the above-mentioned information recording apparatus of the present invention (including its various aspects). More specifically, it makes the computer function as at least one portion of the recording device, the calculating device, the measuring device, and the adjusting device.

The above object of the present invention can be also achieved by a second embodiment of a computer program product in a computer-readable medium for tangibly embodying a program of instructions executable by a computer provided in the above-mentioned information recording/reproducing apparatus of the present invention (including its various aspects), to make the computer function as the above-mentioned information recording/reproducing apparatus of the present invention (including its various aspects). More specifically, it makes the computer function as at least one portion of the information recording apparatus and the reproducing device.

According to the first or second embodiment of the computer program product of the present invention, the above-mentioned information recording apparatus or information recording/reproducing apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the information recording apparatus or information recording/reproducing apparatus of the present invention These effects and other advantages of the present invention become more apparent from the following example.

As explained above, according to the embodiment of the information recording apparatus of the present invention, it is provided with: the recording device; the calculating device; the measuring device; and the adjusting device. Therefore, it is possible to record the record information with an appropriate recording power, so that it is possible to prevent the occurrence of a recording error.

EXAMPLE

Hereinafter, an example of the present invention will be discussed with reference to the drawings.

At first, with reference to FIG. 1, an information recording medium used in an example of the information recording apparatus of the present invention will be discussed. In this example, an optical disc of a recording type is used for explanation as the information recording medium. FIG. 1 shows the structure of the optical disc having a plurality of areas in a substantial plan view on the upper part, and correspondingly shows an area structure in the radial direction in a conceptual view on the lower side.

As shown in FIG. 1, on an optical disc 100, recording (writing) can be performed a plurality of times or once, in various recording methods, such as a magneto optical method and a phase change method. The optical disc 100 has a recording surface on a disc main body with a diameter of about 12 cm, as is a DVD. On the recording surface, the optical disc 100 is provided with: a lead-in area 104; a data recording area 106; and a lead-out area 108, from the inner circumference to the outer circumference, with a center hole 102 as the center. Then, in each recording area, groove tracks and land tracks are alternately provided, spirally or concentrically, with the center hole 102 as the center. The groove tracks may be wobbled, or pre-pits may be formed on one of or both of the tracks. Incidentally, the present invention is not particularly limited to the optical disc having these three areas. For example, even if the lead-in area 104 or the lead-out area 108 does not exist, a file structure explained below can be constructed. Moreover, as described later, the lead-in area 104 and the lead-out area 108 may be further segmentized.

Next, with reference to FIG. 2 to FIG. 11, the example of the information recording apparatus in the present invention will be discussed.

(Basic Structure)

Figure 2:
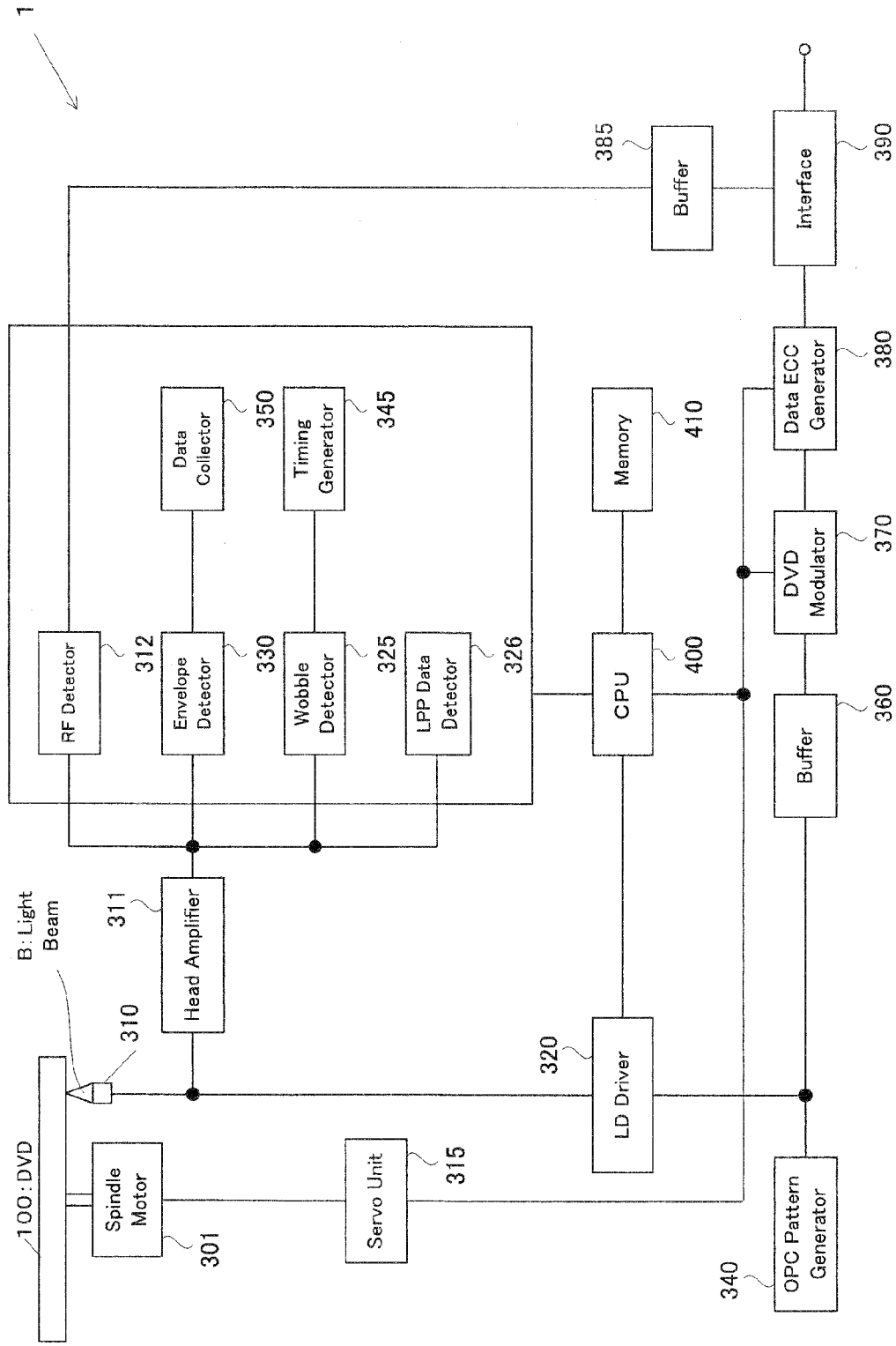
FIG. 2 is a block diagram conceptually showing the basic structure of the example of the information recording apparatus of the present invention.

At first, with reference to FIG. 2, the basic structure of the information recording apparatus in the example will be discussed. FIG. 2 is a block diagram conceptually showing the basic structure of the information recording apparatus in the example.

As shown in FIG. 2, an information recording apparatus 1 in the example is provided with: a spindle motor 301; an optical pickup 310; a head amplifier 311; a RF detector 312; a servo circuit 315; an LD driver 320; a wobble detector 325; a LPP data detector 326; an envelope detector 330; an OPC pattern generator 340; a timing generator 345; a data collector 350; a buffer 360; a DVD modulator 370; a data ECC generator 380; a buffer 385; an interface 390; a CPU 400; and a memory 410.

The spindle motor 301 is constructed to rotate the optical disc 100 at a predetermined speed under spindle servo from the servo circuit 315 or the like.

The optical pickup 310 is intended to perform the recording/reproduction with respect to the optical disc 100, and is provided with a semiconductor laser device, various lenses, an actuator and the like. More specifically, the optical pickup 310 irradiates the optical disc 100 with a light beam, such as laser light, as reading light with a first power upon reproduction, and as writing light with a second power upon recording, with it modulated. The optical pickup 310 is constructed to be displaced in the radial direction or the like of the optical disc 100, by a not-illustrated actuator, slider, or the like, which is driven by the servo circuit 315.

The head amplifier 311 amplifies the output signal (i.e. the reflected light of a light beam B) of the optical pickup 310, and outputs the amplified signal. Specifically, a RF signal as being a reading signal is outputted to the RF detector 312 and the envelope detector 330, and a push-pull signal is outputted to the wobble detector 325 and the LPP data detector 326.

The RF detector 312 is constructed to detect the RF signal and perform demodulation or the like, to thereby output the reproduction data to the exterior through the buffer 385 and the interface 390. Then, on external output equipment (e.g. a display device, such as a liquid crystal display and a plasma display, a speaker, or the like) connected to the interface 390, a predetermined content is reproduced and outputted.

The servo circuit 315 displaces the objective lens of the optical pickup 310, on the basis of a tracking error signal and a focus error signal or the like, which are obtained by processing the light receiving result of the optical pickup 310, to thereby perform various servo processes, such as tracking control and focus control. Moreover, the servo circuit 315 is constructed to servo-control the spindle motor 301, on the basis of a wobble signal obtained from the wobble of the wobbled groove tracks on the optical disc 100.

The LD driver 320 drives the semiconductor laser disposed in the optical pickup 310, in order to determine an optimum recording laser power in the recording and reproduction processes of an OPC pattern described later, upon an OPC process described later. After that, the LD driver 320 drives the semiconductor laser of the optical pickup 310 with the optimum recording laser power determined by the OPC process, upon the data recording. Upon the data recording, the optimum recording laser power is modulated in accordance with the record data.

Incidentally, one specific example of the "recording device" of the present invention is constructed by including the spindle motor 301, the optical pickup 310, the servo circuit 315, the LD driver 320, described above, or the like.

The wobble detector 325 is constructed to detect a push-pull signal which indicates the wobble signal, on the basis of the output signal corresponding to the light requirement from the head amplifier 311, which is a detector, disposed in the optical pickup 310, for receiving a reflected light beam, and to output it to the timing generator 345.

The LPP data detector 326 is constructed to detect a push-pull signal which indicates an LPP signal, on the basis of the output signal corresponding to the light requirement from the head amplifier 311, which is a detector, disposed in the optical pickup 310, for receiving a reflected light beam, and to detect pre-format address information, for example, as described later. Then, the LPP data detector 326 is constructed to output the pre-format address information to the timing generator 345.

The envelope detector 330 is constructed to detect the peak value and the bottom value of envelope detection of the RF signal as being the output signal from the head amplifier 311, in order to determine the reference recording laser power, under the control of the CPU 400, upon the reproduction of the OPC pattern in the OPC process. The envelope detector 330 may include an A/D (Analog/Digital) converter or the like, for example.

The OPC pattern generator 340 is constructed to output a signal which indicates the OPC pattern to the LD driver 320, on the basis of a timing signal from the timing generator 345, upon the recording of the OPC patter in the OPC process before the recording operation.

The timing generator 345 detects absolute position information based on the management unit of the pre-format address information, on the basis of the pre-format address information inputted by the LPP data detector 326, upon the recording of the OPC pattern in the OPC process. Simultaneously, the timing generator 345 detects relative position information based on a slot unit (e.g. a slot unit corresponding to a length which is a natural number multiple of one cycle of the wobble signal) which is smaller than the management unit of the pre-format address information, on the basis of the cycle of the push-pull signal which indicates the wobble signal. Thus, whether or not a recording start position in the OPC process starts from the boundary of the management unit of the pre-format address information, the timing generator 345 can specify the recording start position. After that, the timing generator 345 generates and outputs a timing signal for writing the OPC pattern, on the basis of the cycle of the push-pull signal which indicates the wobble signal outputted from the wobble detector 345. On the other hand, the timing generator 345 can specify a reproduction start position, upon the reproduction of the OPC pattern in the OPC process, as in the recording. After that, the timing generator 345 generates and outputs a timing signal for sampling the reproduced OPC pattern, on the basis of the cycle of the push-pull signal which indicates the wobble signal outputted from the wobble detector 345.

The data collector 350 is mainly a memory in general. For example, it is provided with an external RAM or the like. An envelope detected by the envelope detector 330 is stored into the data collector 350, and on the basis of this, the detection of an optimum recording laser power on the CPU 400, i.e., the OPC process, is performed.

The buffer 360 is constructed to store therein the record data modulated by the DVD modulator 370 and output it to the LD driver 320.

The DVD modulator 370 is constructed to perform DVD modulation with respect to the record data, and output it to the buffer 360. As the DVD modulation, for example, EFM (Eight to Fourteen Modulation) may be performed.

The data ECC generator 380 appends or adds a code for error correction to the record data which is inputted from the interface 390. Specifically, the data ECC generator 380 appends an ECC code in each predetermined block unit (e.g. ECC block unit), and outputs it to the DVD modulator 370.

The buffer 385 stores therein the reproduction data outputted from the RF detector 312, and outputs it to the external output equipment through the interface 390.

The interface 390 receives the input of the record data or the like from external input equipment, and outputs it to the data ECC generator 380. Moreover, it may be constructed to output the reproduction data outputted from the RF detector 312, to the external output equipment, such as a speaker and a display.

The CPU 400 controls the information recording apparatus 1 as a whole, by giving an instruction, i.e. by outputting a system command, to each device, such as the LD driver 320 and the servo circuit 315, in order to detect the optimum recording laser power. Normally, software for operating the CPU 400 is stored in an internal or external memory.

The memory 410 includes a semiconductor memory, such as a RAM and a flush memory, and is constructed to record a correlation equation and an optimum recording power Po, as described later.

Incidentally, the information recording apparatus in the example explained with reference to FIG. 2 is also used as the example of an information recording/reproducing apparatus. In other words, it can reproduce the record information through the head amplifier 311 and the RF detector 312, and it includes the function of an information reproducing apparatus or the function of an information recording/reproducing apparatus in the example.

(Operation Principle)

Next, with reference to FIG. 3 to FIG. 11, the operation principle of the information recording apparatus 1 in the example will be explained.

(1) Operation Before Recording

Figure 3:
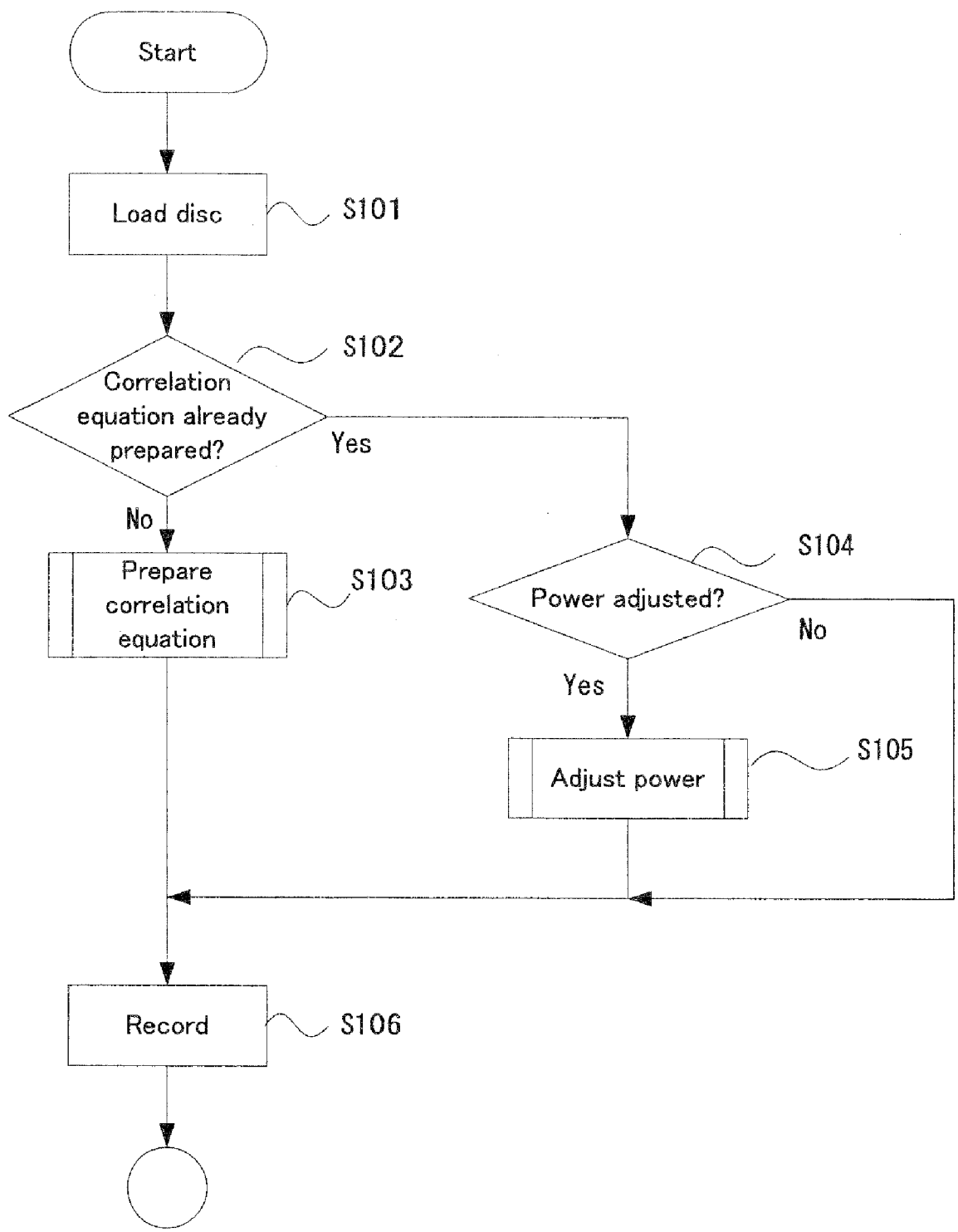
FIG. 3 is a flowchart showing a flow of operation before data recording in the information recording apparatus in the example.
Figure 4:
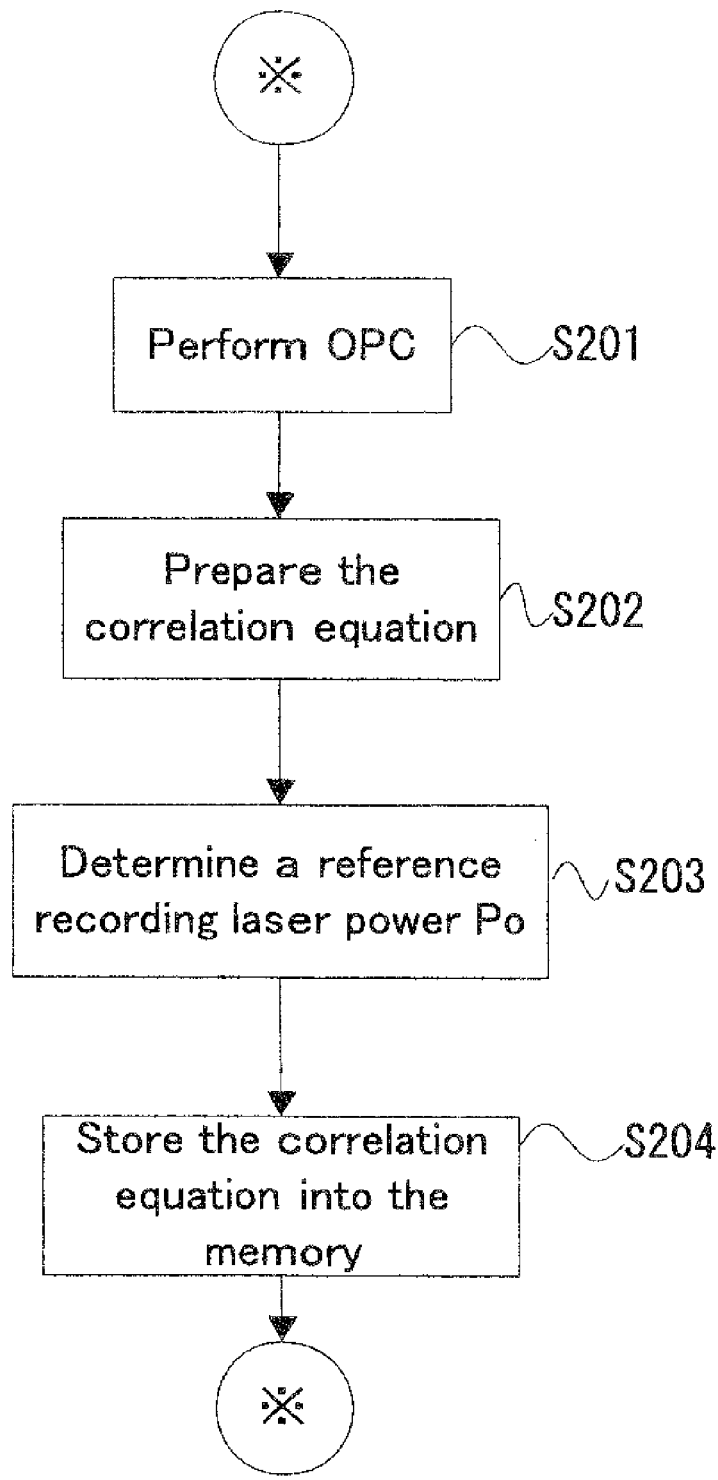
FIG. 4 is a flowchart showing a flow of operation related to preparation of a correlation equation in the information recording apparatus in the example.
Figures 5A, 5B:
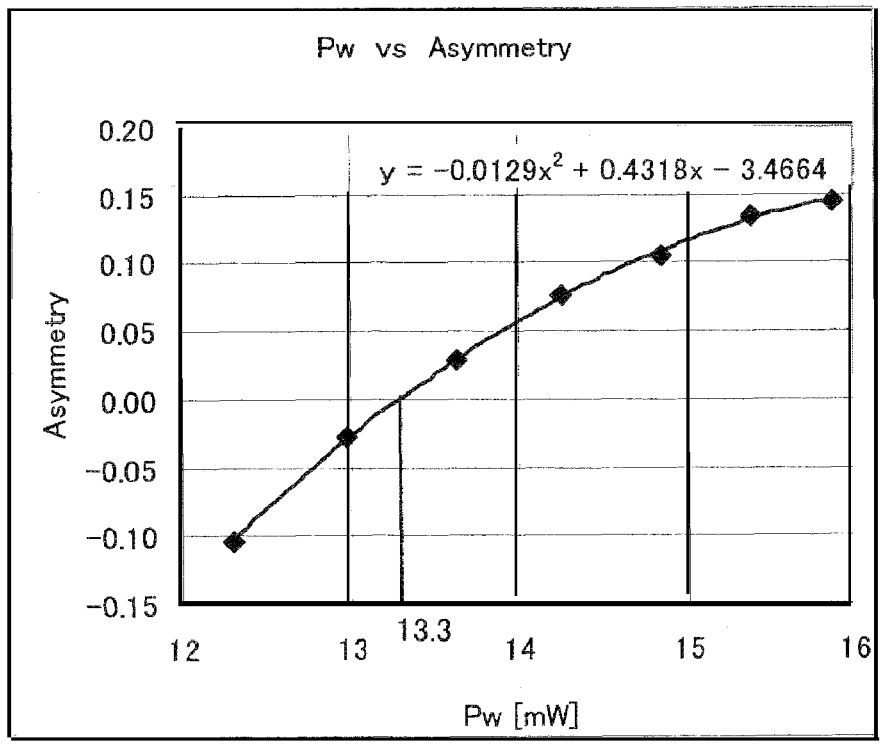
FIG. 5 are a graph showing the correlation equation prepared in the information recording apparatus in the example and a list showing specific numeral values of a recording power and asymmetry which are a basis of the preparation of the correlation equation.
Figure 6:
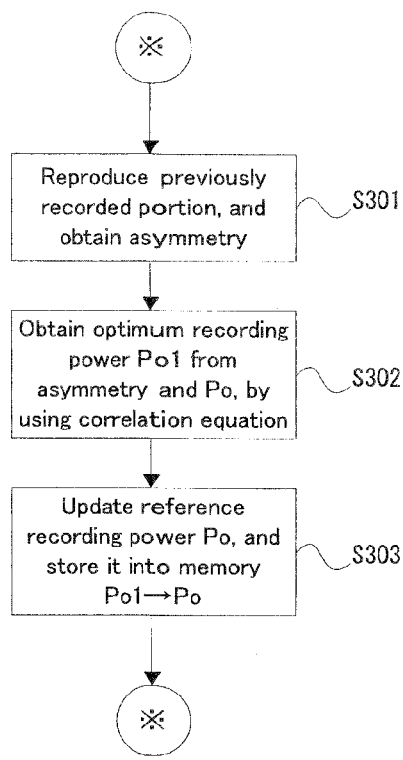
FIG. 6 is a flowchart showing a flow of operation of adjusting the recording laser power in the information recording apparatus in the example.
Figure 7:
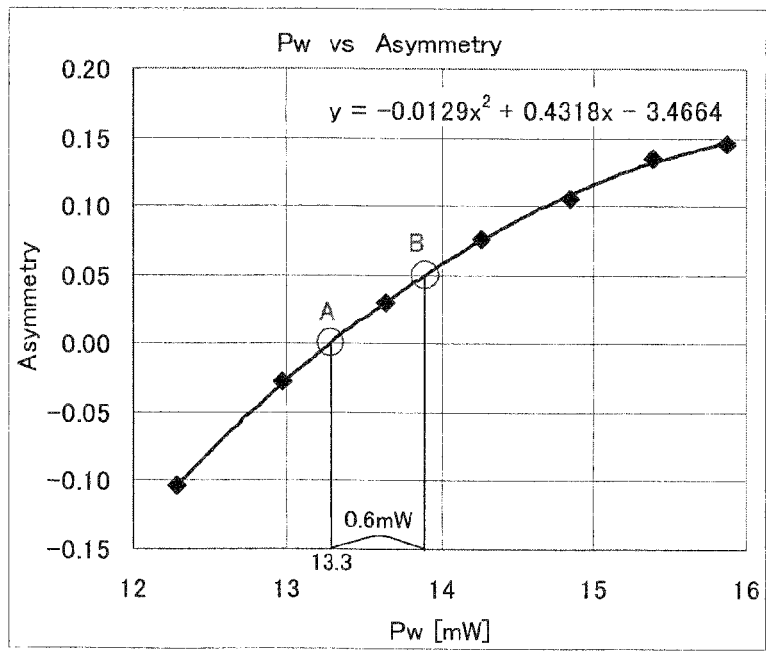
FIG. 7 is a graph conceptually showing a state on the correlation equation upon the adjustment of the recording laser power in the information recording apparatus in the example.

At first, with reference to FIG. 3 to FIG. 7, the operations of the information recording apparatus 1 in the example before recording various data will be discussed. FIG. 3 is a flowchart showing a flow of operation before data recording in the information recording apparatus 1 in the example. FIG. 4 is a flowchart showing a flow of operation related to preparation of a correlation equation between a recording laser power and asymmetry. FIG. 5 are a graph showing the prepared correlation equation and a list showing specific numeral values of a recording power and asymmetry which are a basis of the preparation. FIG. 6 is a flowchart showing a flow of operation of adjusting the recording laser power. FIG. 7 is a graph conceptually showing a calculation operation on the correlation equation at the time of the adjustment operation.

Incidentally, in the example, the terms of "reference recording laser power" and "optimum recording laser power" are used. The "reference recording laser power" is mainly a guide for the recording laser power when the data is recorded, and is mainly obtained by the OPC process. Moreover, the "optimum recording laser power" obtained once is treated as the "reference recording laser power" at the time of the subsequent data recording, as described later. On the other hand, the "optimum recording laser power" indicates the value of an optimum recording laser power at the time point of the recording, which is calculated, as occasion demands, during the data recording.

In FIG. 3, at first, the optical disc 100 is loaded (step S101). Then, under the control of the CPU 400, a seek operation is performed by the optical pickup 310, and various data for management necessary for the recording process onto the optical disc 100 is obtained. On the basis of the data for management, the data is recorded onto the optical disc 100 through the interface 390, in accordance with an instruction from the external input equipment or the like, by the control of the CPU 400.

After this loading, under the control of the CPU 400, it is judged whether or not a correlation equation which indicates a relationship between the recording laser power and the asymmetry is already prepared, under the control of the CPU 400 (step S102). Here, it may be judged whether or not the correlation equation is recorded in the memory 410 of the information recording apparatus 1, for example. Alternatively, it may be judged whether or not the correlation equation is recorded on the optical disc 100 itself.

As a result of the judgment, if the correlation equation is not prepared (the step S102: No), the correlation equation is prepared (step S103). Now, the preparation operation of the correlation equation is described in more detail, with reference to FIG. 4 and FIG. 5.

As shown in FIG. 4, at first, the OPC process is performed (step S201). Here, the OPC process is explained, more specifically. At first, under the control of the CPU 400, the optical pickup 310 is displaced to a power calibration area disposed in the lead-in area 104. Then, by the control of the OPC pattern generator 340 and the LD driver 320 or the like, the recording laser power is changed sequentially in stages (e.g. changed mutually different 16 step recording laser power), and the OPC pattern as being one specific example of the "test-record information" of the present invention is recorded into the power calibration area. A recording pattern in which a short pit corresponding to a 3 T pulse and a long pit corresponding to 11 T pulse are alternately formed with respective non-recording sections, which have the same length as that of the short pulse or the long pulse, is taken as one example of the OPC pattern.

The LD driver 320 drives the semiconductor laser in the optical pickup 310, in order to change the recording laser power sequentially in stages, in accordance with the OPC pattern outputted from the OPC pattern generator 340.

Moreover, after the completion of the recording of the OPC pattern into the power calibration area, the OPC pattern recorded in the power calibration area is reproduced, under the control of the CPU 400. Then, by the RF signal inputted to the envelope detector 330, the peak value and the bottom value of the envelope detection of the RF signal are sampled and outputted to the data collector 350. Then, under the control of the CPU 400, the peak value and the bottom value are stored into the data collector 350. Then, the OPC pattern is reproduced, in accordance with the number of times that the OPC pattern is recorded, in one OPC process, and the asymmetry is obtained from the peak value and the bottom value at each time of the reproduction.

Incidentally, one specific example of the "calculating device" of the present invention is constructed by including the CPU 400, the OPC pattern generator 340, described above, or the like.

Then, the correlation equation as being one specific example of the "correlation information" of the present invention is prepared on the basis of the result of the OPC process performed in the step S201 (step S202). In other words, a function is prepared in the step S202 which indicates the relationship between the recording laser power changed sequentially in stages and the asymmetry of the OPC pattern recorded with the recording laser power.

For example, it is assumed that the relationship between the recording laser power and the asymmetry shown in FIG. 5(*a*) is obtained. At this time, if the relationship is plotted on a graph with the vertical axis as the asymmetry and the horizontal axis as the value of the recording laser power and the plotted points are connected by an approximate curve, the graph shown in FIG. 5(*b*) is obtained. The approximate curve can be obtained by using a mathematical or statistical method, such as a least-squares method, for example. Then, with regard to the relationship shown in FIG. 5(*a*), if the least-squares method or the like is used, the value of the recording laser power is x, and the value of the asymmetry is y, the correlation equation is indicated by a function "$y=-0.0129x^2+0.4318x-3.4664$".

Incidentally, in the example, the correlation equation is prepared by a quadric curve; however, without limit to this, the correlation equation may be prepared by an arbitrary function shown by a cubic curve, a quartic curve, or the like, for example.

In FIG. 4 again, a recording laser power which minimizes the asymmetry (e.g. 0) is obtained as the reference recording laser power Po (step S203). For example, if the correlation equation as shown in FIG. 5(*b*) is obtained, a value 13.3 mW of the recording laser power which gives the asymmetry of 0 is obtained, as the reference recording laser power Po.

However, on the standard of a DVD-ROM or the like, for example, the appropriate recording operation or the like can be performed in an asymmetry range of −0.05 to 0.15. Thus, it is not always necessary to set the value of the recording laser power which gives the asymmetry of 0. For example, it may be to set the value of the recording laser power which gives the asymmetry of other values, such as 0.10 and −0.03.

Then, the correlation equation prepared in the step S202 (i.e. the correlation equation $y=-0.0129x^2+0.4318x-3.4664$) is recorded into the memory 410 (step S204). At this time, the reference recording laser power Po (i.e. the numerical value of 13.3 mW) is also recorded into the memory 410, simultaneously.

Back in FIG. 3, after that, the data is recorded with the reference recoding laser power Po (step S106). Specifically, the optical pickup 310 is displaced to a recording area (e.g. the data recording area 106 or the like, shown in FIG. 2), and the laser light is modulated in accordance with the record data with the recording laser power obtained in advance, under the control of the LD driver or the like, to thereby record the record data into the recording area. In other words, a recording pit is formed on the track, in accordance with the record data.

On the other hand, if it is judged that the correlation equation is prepared (the step S102: Yes), it is judged whether or not the reference recording laser power is adjusted by using the correlation equation, under the control of the CPU 400 (step S104). In the judgment here, it may be judged that the optimum recording laser power is adjusted if there is a relatively large change in a time length that the recording operation is continued and in a position where the data is recorded on the optical disc 100.

Incidentally, since the operation here is performed before the data recording, it can be also considered that there is not such a case in which the data is already recorded. However, in the case in which the recording of the data is temporarily stopped without unloading the optical disc 100, for example, the judgment in the step S104 and the subsequent adjustment of the recording laser power are effective.

As a result of this judgment, if it is judged that the optimum recording laser power is not adjusted (the step S104: No), the recording operation of the data is performed (step S106). Here, the data is recorded, with the recording laser power which gives the asymmetry of 0 (i.e. the reference recording laser power Po) on the basis of the recorded correlation equation. Namely, if the correlation equation as shown in FIG. 5(*b*) is recorded, for example, the data is recorded with the recording laser power of 13.3 mW. Alternatively, if the reference recording laser power Po is recorded in the memory 410, the data may be recorded with that recording laser power.

On the other hand, if it is judged that the reference recording laser power Po is adjusted (the step S104: Yes), the adjustment operation of the reference recording laser power Po is performed (step S105).

Now, with reference to FIG. 6 and FIG. 7, the adjustment operation of the reference recording laser power Po will be explained in more detail.

As shown in FIG. 6, at first, a previously recorded portion is reproduced, and the asymmetry Asy thereof is obtained by the operation of the envelope detector 330 as being one specific example of the "measuring device" of the present invention (step S301). Specifically, the data recorded immediately before the adjustment operation of the reference recording laser power Po or recorded at a time which can be substantially equated with "immediately before" is reproduced, and the asymmetry Asy is obtained from the reproduction signal thereof (i.e. the RF signal).

Then, by the operation of the CPU 400 as being one specific example of the "adjusting device" of the present invention, an optimum recording laser Po1 after the adjustment is obtained from the asymmetry Asy obtained at the step S301 and the reference recording laser power Po which has been used in the data recording, by using the correlation equation (step S302).

This will be specifically explained with numerical values. It is assumed that the asymmetry Asy obtained at the step S301 is "0.05", and that the reference recording laser power Po with which the data is recorded immediately before is "13.3 mW". As shown in FIG. 7, the point at which the asymmetry is originally to be "0" is represented by an A point in FIG. 7. The recording laser power at the point has a lower value than that of the recording laser power at a B point which gives the asymmetry of "0.05". This is because the absolute value of the optimum recording laser power for the data recording is changed due to a change in characteristics caused by a difference in the recording position on the optical disc 100, for example. In other words, if the data is recorded at the reference recording laser power Po of 13.3 mW obtained in the OPC process, the asymmetry which is originally to be "0" is to be "0.05" when the data is reproduced. At this time, on the basis of the graph shown in FIG. 7, it can be considered that there is a need to record the data with a recording laser power lower than 13.3 mW in order to make the asymmetry "0".

At this time, a difference in the recording laser power between the A point and the B point is 0.6 mW on the basis of the correlation equation. Namely, a difference in the recording laser powers which give the asymmetry of "0" and "0.05" is 0.6 mW. This numerical value is one specific example of the "adjustment amount" of the present invention. Thus, it can be considered that the asymmetry is "0" if the recording laser power when the data is recorded is reduced by 0.6 mW Therefore, as the optimum recording laser power Po1 after the adjustment, a numerical value of 13.3 mW−0.6 mW=12.7 mW is obtained.

Again in FIG. 6, the optimum recording laser power Po1 after the adjustment, obtained at the step S302, is updated to as a new reference recording laser power Po, and is recorded into the memory 410 (step S303). Then, after this, the data is recorded with the new reference recording laser power Po (i.e. the optimum recording laser power Po1) obtained here. The recording operation of the data will be discussed in detail later (refer to FIG. 8).

As described above, it is possible to further adjust the value of the reference recording laser power obtained by the OPC process. In other words, it is possible to obtain a more preferable optimum recording laser power, by using the asymmetry of the actually recorded data and the correlation equation obtained by the OPC process. Incidentally, in the OPC process conventionally performed, if the value of a recording laser power is obtained, various data obtained in the process (i.e. the correlation equation, etc.) is deleted or discarded. However, in the example, there is such a great advantage that it is possible to obtain a more preferable optimum recording laser power corresponding to the recording characteristics or the like of the optical disc 100, by effectively using the various data (particularly, the correlation equation).

Moreover, as described later, by adjusting the recording laser power, as occasion demands, even during the data recording, it is possible to continue more appropriate data recording, and it is also possible to improve even the reproduction quality of the recorded data.

Moreover, in the example, the value of the asymmetry is used as one specific example of the "reproduction quality" of the present invention; however, without limit to this, the recording laser power may be adjusted on the basis of a jitter value, a reproduction error rate, or the like, for example.

(2) Operation During Recording

Figure 8:
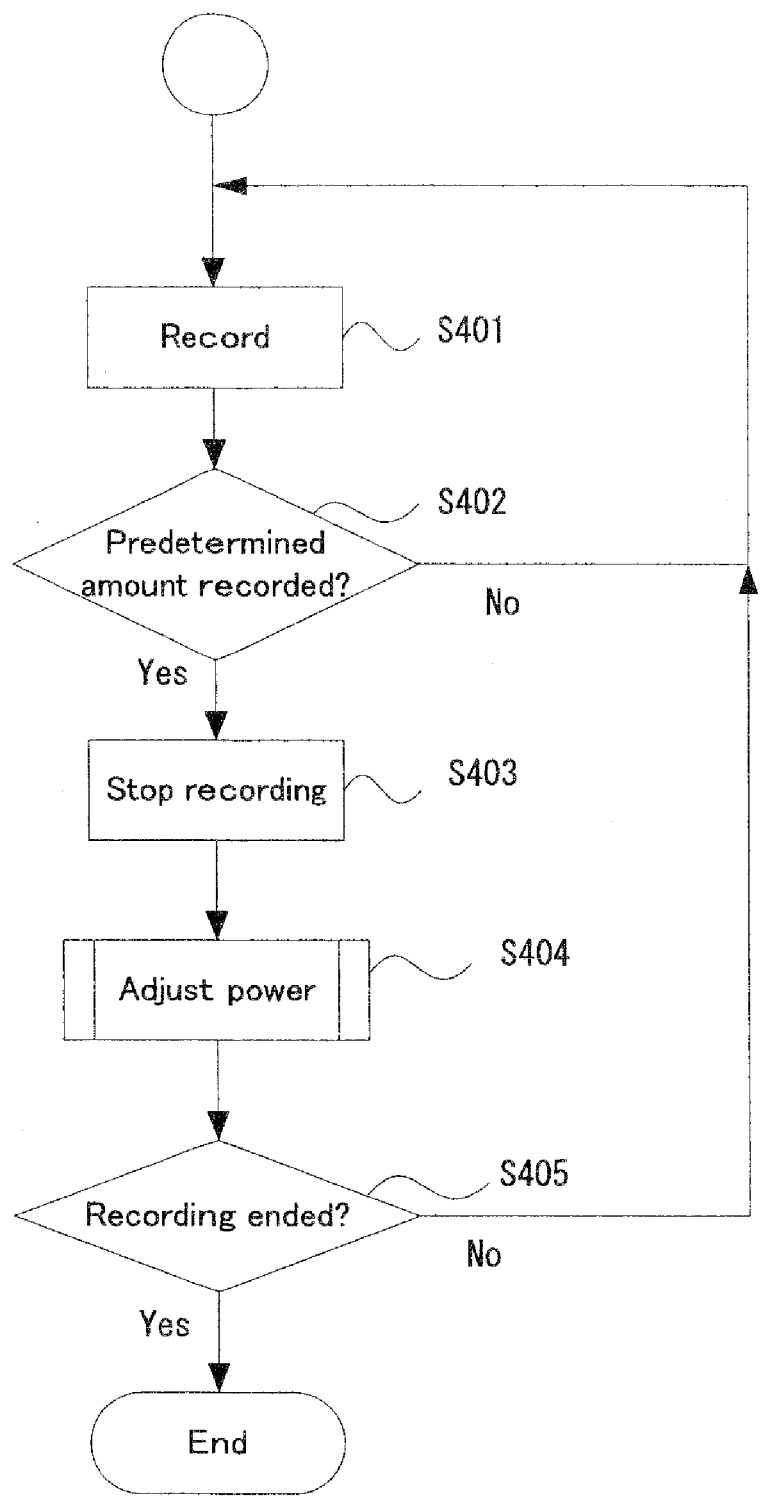
FIG. 8 is a flowchart showing a flow of operation during the data recording in the information recording apparatus in the example.

Next, with reference to FIG. 8, an explanation will be given to an operation while the information recording apparatus 1 in the example is recording the data. FIG. 8 is a flowchart showing a flow of operation during the data recording.

As shown in FIG. 8, the recording operation of the data is performed (step S401). After that, under the control of the CPU 400, it is judged whether or not a predetermined amount of data is recorded (step S402). The predetermined amount which is a judgment reference here may be 1 ECC block, or several ECC blocks having a larger size than 1 ECC block, or may have a smaller size than 1 ECC block. In any sizes, it is preferable to have a size to the degree that the asymmetry can be measured by reproducing the data recorded by the predetermined amount. Moreover, these numerical values may be determined in advance in the information recording apparatus 1, or may be changed, as occasion demands, by a user of the information recording apparatus 1, the CPU 400 or the like. Moreover, it may be judged whether or not the data may be recorded in a predetermined period, not by the amount of the recorded data.

As a result of the judgment, if it is judged that the predetermined amount of data is not recorded (the step S402: No), the data is recorded again, and it is judged again whether or not the predetermined amount of data is recorded.

On the other hand, if it is judged that the predetermined amount of data is recorded (the step S402: Yes), the recording operation is temporarily stopped (step S403), and the reference recording laser power Po is adjusted as described above (step S404). Then, under the control of the CPU 400, it is judged whether or not the recording operation is ended (step S405).

As a result of the judgment, if it is judged that the recording operation is ended (the step S405: Yes), the recording operation is ended, and the optical disc 100 on which the desired data is recorded is ejected, if needed. On the other hand, if it is judged that the recording operation is not ended (the step S405: No), the operational flow returns to the step S401 again, and the recording of the data is continued.

As described above, even during the data recording, it is possible to adjust the reference recording laser power every time the predetermined data is recorded. Thus, in any position on the recording surface of the optical disc 100, if the reference recording laser power is adjusted at the position, it is possible to record the data with a more preferable recording laser power in any position.

(3) Soft Landing Operation

Figure 9:
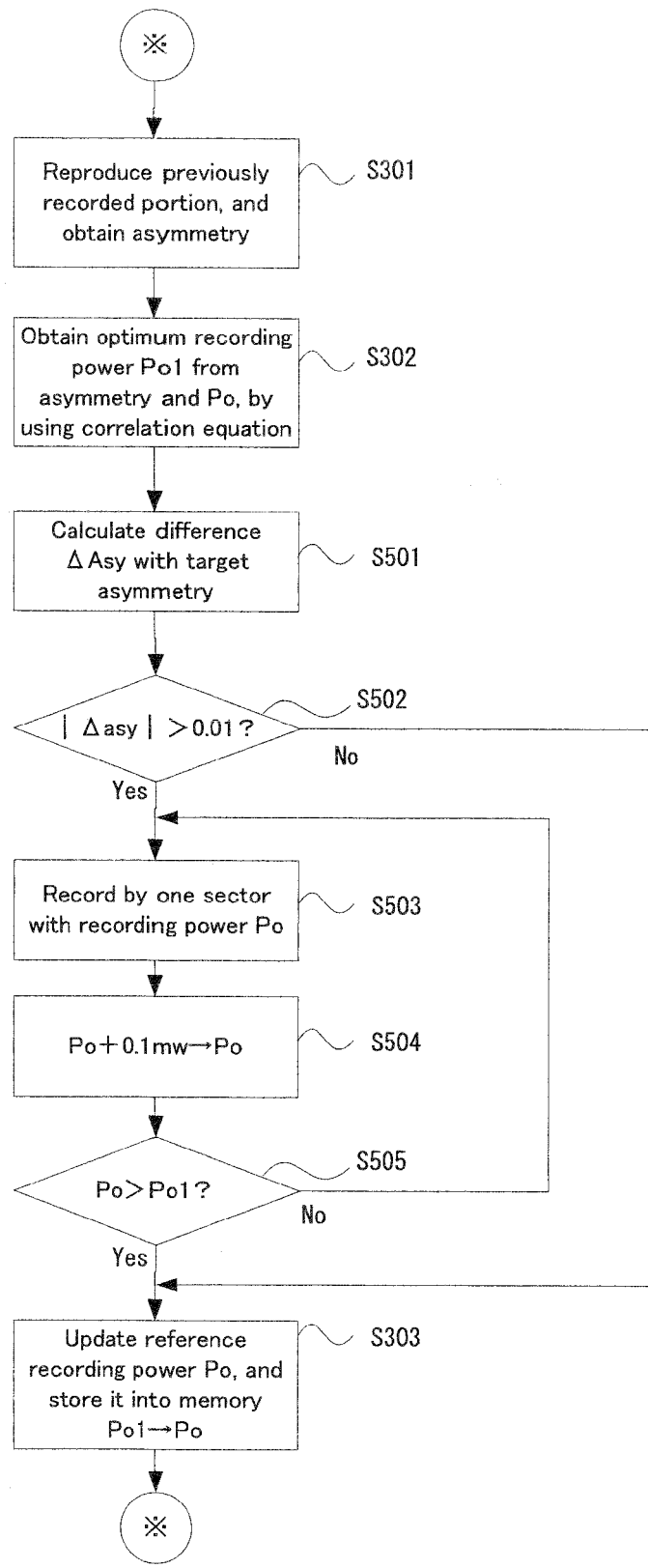
FIG. 9 is a flowchart showing a flow of soft landing operation in the information recording apparatus in the example.
Figure 10A:
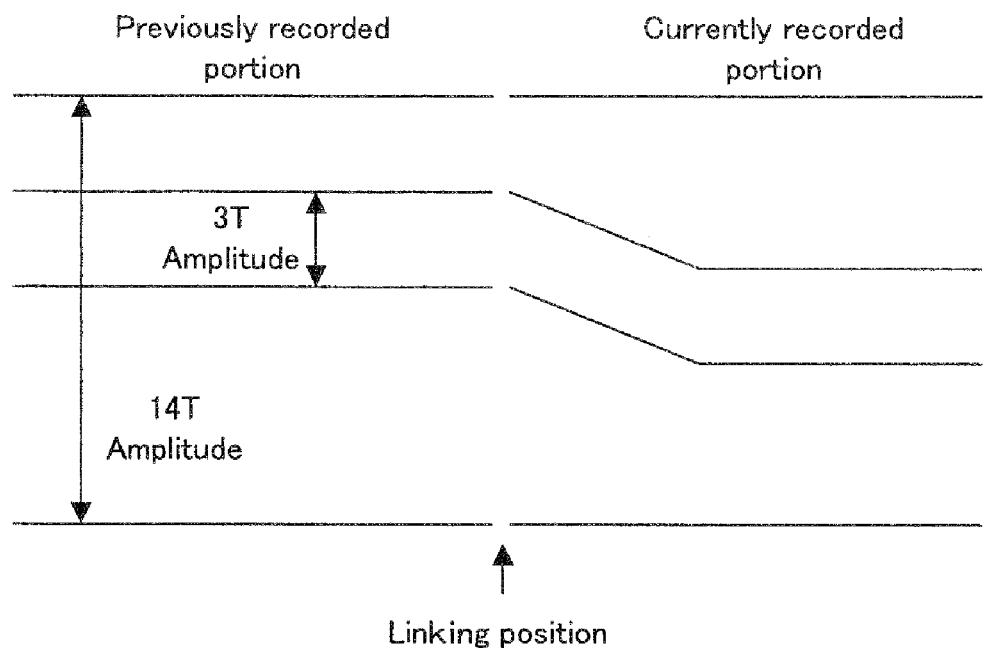
FIG. 10 are explanatory diagrams conceptually showing a state of the asymmetry at the time of the soft landing operation, in the information recording apparatus in the example.
Figure 10B:
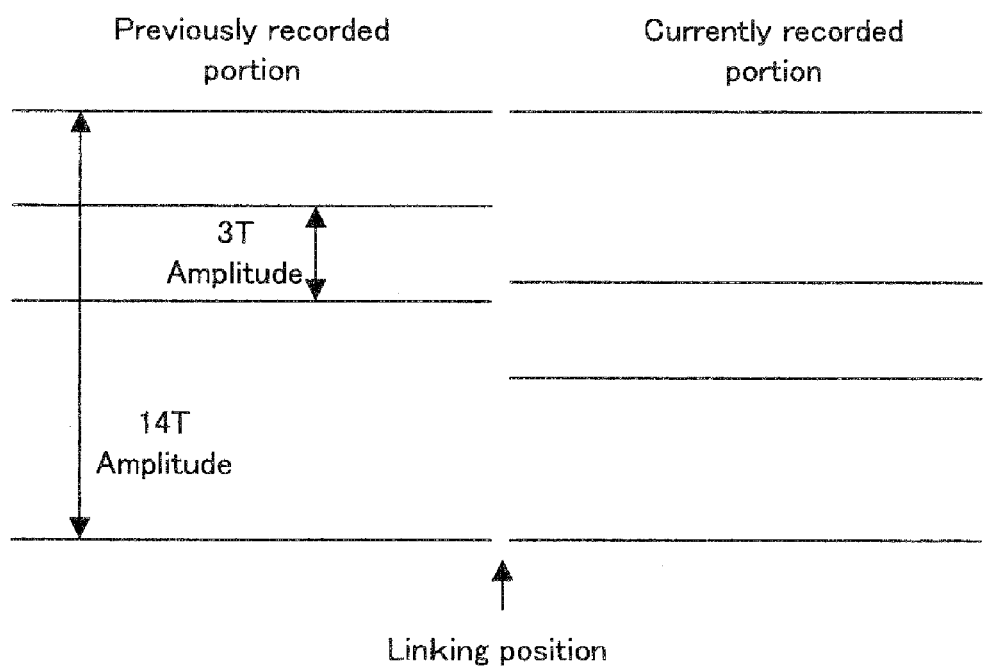

Next, with reference to FIG. 9 and FIG. 10, the soft landing operation of the information recording apparatus 1 in the example will be explained. FIG. 9 is a flowchart showing a flow of the soft landing operation. FIG. 10 are explanatory diagrams conceptually showing a state of the asymmetry at the time of the soft landing operation. Incidentally, the same operations as the above-mentioned various operations carry the same step numbers, and the detailed explanation thereof is omitted.

Incidentally, the soft landing operation indicates such an aspect that the value of the recording laser power is gradually changed, when the recording laser power is adjusted and changed from Po to Po1, as described above. In this case, the adjustment operation of the recording laser power, explained by using FIG. 6, is different from the above-mentioned explanation of operations. Therefore, here, a difference is explained in detail.

As shown in FIG. 9, the asymmetry Asy is obtained by reproducing the data recorded immediately before (the step S301), and the optimum recording laser power Po1 after the adjustment is obtained (the step S302). Then, under the control of the CPU 400, a difference ΔAsy between the asymmetry obtained at the step S301 and target asymmetry is obtained (step S501). For example, if the asymmetry obtained at the step S301 is "0.05" and the target asymmetry is "0", the difference ΔAsy is "0.05".

Then, under the control of the CPU 400, it is judged whether or not the absolute value of the difference |ΔAsy| is greater than 0.01 (step S502). It is judged whether or not the asymmetry obtained at the step S301 and the target asymmetry have greatly different values. The numerical value of "0.01" which is this judgment reference is not limited to this. It is preferable to set a less value in order to perform the soft landing operation more strictly. On the other hand, it is preferable to set a greater value in order not to perform the soft landing operation much. The setting may be performed by a user of the information recording apparatus 1 with a remote controller, an operation button, or the like. Alternatively, the setting may be performed, automatically, by the CPU 400.

As a result of the judgment, if it is judged that the difference is not grater than 0.01 (the step S502: No), the optimum recording laser power Po1 after the adjustment, obtained at the step S302, is updated as a new reference recording laser power Po without the soft landing operation (the step S303), and the data is recorded. As described above, if the asymmetry Asy and the target asymmetry do not have greatly different values, an auto slicer described later can follow a change in the asymmetry, even if the data is not recorded by the soft landing operation. Therefore, it is possible to let the information reproducing apparatus, such as a player, appropriately reproduce the data.

On the other hand, if it is judged that the difference is grater than 0.01 (the step S502: Yes), the data is recorded into a recording area corresponding to one sector (step S503). At this time, the recording laser power with which the data is recorded is the reference recording laser power Po before the adjustment.

Then, the recording laser power obtained by adding 0.1 mW to Po is set to be a new reference recording laser power Po (step S504). Then, under the control of the CPU 400, it is judged whether or not Po (i.e. 0.1 mW-added Po) is greater than Po1 (step S505).

As a result of the judgment, if it is judged that Po is greater than Po1, the Po1 is updated as a new reference recording laser power Po (the step S303). On the other hand, if it is judged that Po is not greater than Po1 (the step S505: No), the data is recorded into the recording area corresponding to one sector, with the 0.1 mW-added reference recording laser power Po, and the subsequent operations are repeated. At his time, the recording area corresponding to one sector is preferably a recording area adjacent to the previously recorded recording area.

Incidentally, in FIG. 9, such a case is assumed that the optimum recording laser power Po1 after the adjustment is greater than the reference recording laser power Po before the adjustment. Therefore, if Po1 is less than Po, it is necessary to set a recording laser power obtained by subtracting 0.1 mW from Po to be a new reference recording laser power Po, and to subsequently change the data, at the step S504. Then, in the judgment in the step S505, it is necessary to judge whether or not Po is less than Po1.

Moreover, the numerical value of "0.1 mW" which is added or subtracted, as occasion demands, at the step S504 (i.e. one specific example of the "predetermined adjustment amount" of the present invention) may be changed, as occasion demands. For example, in order to change the recording laser power milder, it is preferable to set the numerical value to be smaller. On the other hand, in order to reduce the number of times of the change steps even if the change of the recording laser power is rapid or sudden, it is preferable to set the numerical value to be larger. Moreover, the numerical value of "one sector" which is the size of an area to record therein the data at the step S503 may be also changed, as occasion demands. For example, the recording may be performed in units of several sectors, or maybe performed in units of one or several ECC blocks. Alternatively, the recording may be performed in units of a predetermined size of recording area other than the above. Alternatively, the size of the area to record therein the data may be set on the basis of a time length required for the change of the recording laser power. For example, the reference recording laser power Po may be changed to the optimum recording laser power Po2, in substantially one second. Then, such a change may be automatically performed by the operation of the CPU 400, for example, or may be performed on the basis of an instruction from the user with a remote controller, an operation button, or the like.

Then, by performing the soft landing operation in this manner and recording the data, as shown in FIG. 10(*a*), the change in the asymmetry is mild in a 3 T amplitude pattern (i.e. one of reproduction signals when the data is reproduced) after the adjustment and before the adjustment of the recording laser power. In other words, across a linking position which is one boundary of the data recording, the asymmetry changes relatively mildly, without a rapid change in the asymmetry. Therefore, even if an auto slicer of the information reproducing apparatus has bad responsiveness, or even in the case of a data structure which adopts a lossless link or the like, the auto slicer can follow the change in the asymmetry, so that it is possible to appropriately reproduce the data.

Incidentally, the auto slicer is mainly to trace the data recorded on the optical disc 100 (specifically, the recording pit, etc.) and to binalize a signal reproduced from the recording pit.

If the soft landing operation is not performed, as shown in FIG. 10(*b*), the asymmetry changes suddenly, across the linking position. Thus, if the auto slicer has the bad responsiveness or if an interval between the data and the data is relatively narrow as in the lossless link, the auto slicer cannot follow the change in the asymmetry, which causes such a disadvantage that the data cannot be appropriately reproduced (e.g. occurrence of a reading error, or the like).

However, the present invention has such great advantages that it is possible to effectively prevent the disadvantage by performing the soft landing operation and that it is possible to preferably record the data so as to enable the information reproducing apparatus to appropriately reproduce the data. Then, it has such a great advantage that it is possible to effectively prevent a reproduction error upon the reproduction of the recorded data, as compared to the recording apparatus disclosed in the above-mentioned background art document.

(4) Adjustment Operation of Laser Power Performed Plurality of Times

Figure 11:
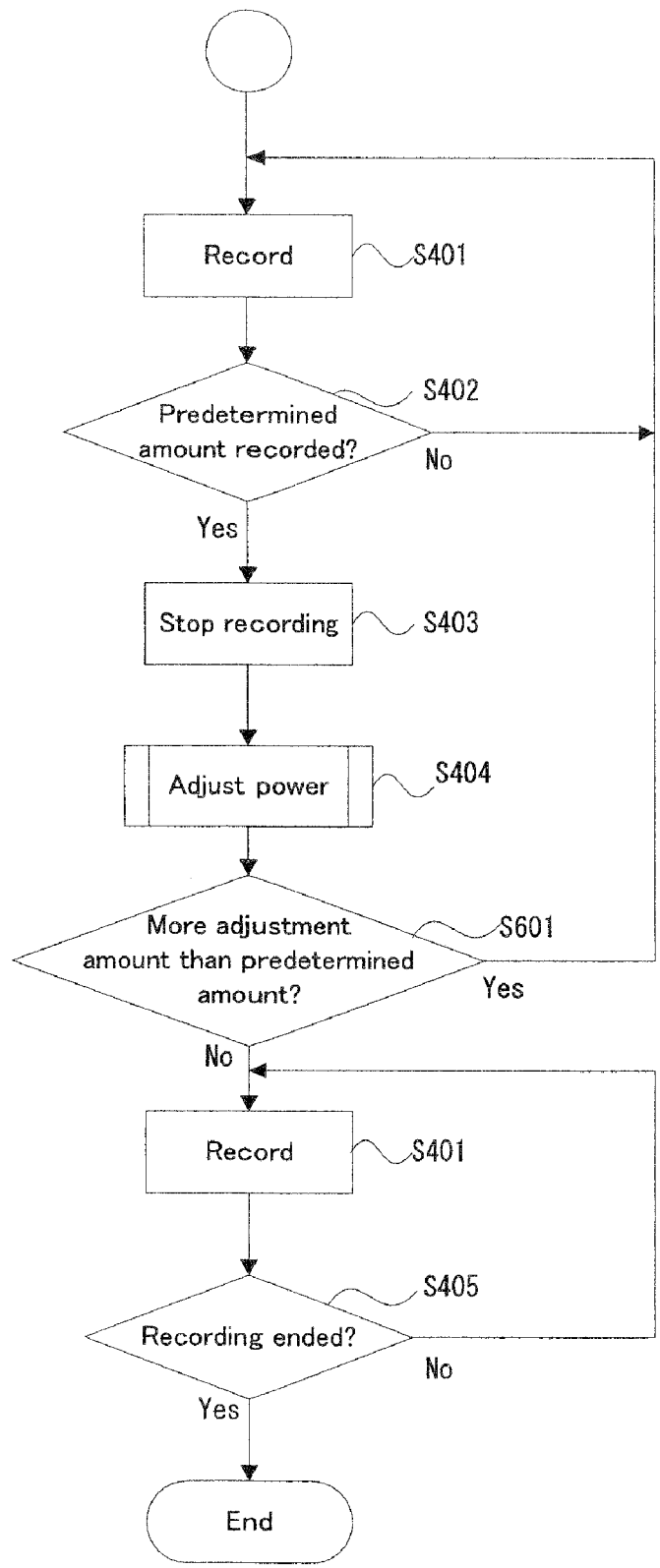
FIG. 11 is a flowchart showing a flow of operation of repeating the adjustment a plurality of times, in the information recording apparatus in the example.

Next, with reference to FIG. 11, an explanation will be given to an operation of repeating the adjustment a plurality of times during one adjustment operation of the recording laser power in the information recording apparatus 1 in the example. Namely, the operation during the recording, explained in the above-mentioned (2), is an operation of adjusting the recording laser power once; however, here the adjustment is repeated a plurality of times, if needed. FIG. 11 is a flowchart showing a flow of operation of repeating the adjustment a plurality of times. Incidentally, the same operations as the above-mentioned various operations carry the same step numbers, and the detailed explanation thereof is omitted.

As shown in FIG. 11, the data is recorded onto the optical disc 100 (the step S401), and it is judged whether or not a predetermined amount of data is recorded (the step S402). As a result of the judgment, if it is judged that the predetermined amount of data is not recorded (the step S402: No), the data is recorded again. On the other hand, if it is judged that the predetermined amount of data is recorded (the step S402: Yes), the recording is stopped (the step S403), and the recording laser power is adjusted (the step S404).

In particular, here, under the control of the CPU 400, it is judged whether or not the adjustment amount of the recording laser power is greater than a predetermined amount (step S601).

As a result of the judgment, if it is judged that the adjustment amount is not greater (the step S601: No), after that, the recording operation of the data is continued without the adjustment of the recording laser power (the step S405, the step S401). However, in the case in which a recording position into which the data is recorded is greatly changed or in a similar case, the operational flow may return to the step S401 to adjust the recording laser power. On the other hand, if it is judged that the adjustment amount is greater (the step S601: Yes), after that, the recording of the data is continued with the adjustment of the recording laser power. Namely, even after the recording laser power is adjusted once, the adjustment operation is performed again.

Incidentally, the "predetermined amount" here is preferably determined in view of a measurement error when the asymmetry is measured. For example, the adjustment amount which gives asymmetry of "0.1" may be set as the predetermined amount.

It is considered that the power value converges on a value which allows the optimum recording laser power, by repeating the adjustment operation a plurality of times. What is important here is the comparison operation of the recording laser power. If the adjustment amount is less than the predetermined amount, it is possible to assume that the value is close to the optimum recording laser power. Thus, it is possible to suppress the adjustment operation to a necessary limit without excessive adjustment of the recording laser power. On the other hand, if the adjustment amount is greater than the predetermined amount, it is possible to assume that the value is not close to the optimum recording laser power. Thus, the power value is adjusted to be closer to the optimum recoding laser power by repeating the adjustment operation again. As described above, by judgment whether to perform the adjustment operation on the basis of the adjustment amount of the recording laser power, for example, it is suppress the adjustment operation to the minimum necessary, as compared to an aspect of adjusting the recording laser power in each predetermined cycle, as in the above-mentioned patent document 2. Thus, the present invention has such great advantages that it allows the efficient recording operation and leads to improvement in the processing performance of the information recording apparatus 1 as a whole.

Incidentally, if the position where the data is recorded is greatly changed, it can be also considered that the value of the optimum recording laser power is greatly changed, due to a change in the recording characteristics. Therefore, the above-mentioned operation is preferably applied in the case in which the data is recorded into a recording area which is included in such a range that the recording characteristics are the same or can be regarded as the same. Then, in the case in which the position where the data is recorded is greatly changed, it is preferable to return to the step S401 on the upper side of FIG. 11 and operate to perform the adjustment operation again.

Moreover, in the above-mentioned example, the optical disc 100 is explained as one example of the information recording medium, and the recorder related to the optical disc 100 is explained as one example of the information recording apparatus. The present invention, however, is not limited to the optical disc and the recorder thereof, and can be applied to other various information recording media and players thereof that support high-density recording or a high transfer rate.

The present invention is not limited to the above-described example, and various changes may be made, if desired, without departing from the essence or spirit of the invention which can be read from the claims and the entire specification. An information recording medium, an information recording apparatus, an information recording method, and a computer program for recording control, all of which involve such changes, are also intended to be within the technical scope of the present invention.

INDUSTRIAL APPLICABILITY

The information recording medium, the information recording apparatus, the information recording method, and the computer program according to the present invention can be applied to a high-density optical disc in which various information can be recorded at high density, for consumer use or for commercial use, and also applied to a recorder or a player or the like associated with the optical disc. Moreover, they can be applied to a recording or reproducing apparatus or the like which is mounted on various computer equipment for consumer use or for commercial use, or which can be connected to various computer equipment.

The invention claimed is:

1. An information recording apparatus comprising:
a recording device for recording record information onto an information recording medium by irradiating the information recording medium with laser light with a recording power according to a set value;
a calculating device for preparing correlation information which represents a correlation between the set value and reproduction quality, and for obtaining a reference set value which gives target reproduction quality as being desired reproduction quality, by reproducing test-record information recorded with changing the set value;
a measuring device for measuring the reproduction quality, by reproducing the record information recorded by using the reference set value, at least in each information amount in which the reproduction quality can be measured; and an adjusting device for obtaining adjustment amount of the reference set value on the basis of the correlation information if the reproduction quality measured by said measuring device is different from the target reproduction quality, and for adjusting the reference set value such that a set value which is adjusted based on the adjustment amount is to be a new reference set value.

2. The information recording apparatus according to claim 1, wherein said adjusting device adjusts the reference set value, by a predetermined adjustment amount, in stages.

3. The information recording apparatus according to claim 2, wherein size of the predetermined adjustment amount is variable.

4. The information recording apparatus according to claim 1, wherein said adjusting device does not adjust the reference set value if the adjustment amount of the reference set value is equal to or less than a predetermined amount.

5. The information recording apparatus according to claim 1, wherein the reproduction quality is reproduction quality including at least one of an asymmetry value, a jitter value and a reproduction error rate.

6. The information recording apparatus according to claim 1, wherein said measuring device measures the reproduction quality of the record information recorded by said recording device immediately before measurement.

7. The information recording apparatus according to claim 1, further comprising a controlling device for controlling said recording device to record at least one of the correlation information obtained by said calculating device and information as for the reference set value, onto the information recording medium.

8. The information recording apparatus according to claim 1, wherein the information amount has such a size that an ECC block is a reference unit.

9. The information recording apparatus according to claim 1, wherein the information amount has a size based on a time length in which the record information is recorded.

10. An information recording method comprising:

a recording process of recording record information onto an information recording medium by irradiating the information recording medium with laser light with a recording power according to a set value;

a calculating process of preparing correlation information which represents a correlation between the set value and reproduction quality, and of obtaining a reference set value which gives target reproduction quality as being desired reproduction quality, by reproducing test-record information recorded with changing the set value;

a measuring process of measuring the reproduction quality, by reproducing the record information recorded by using the reference set value, at least in each information amount in which the reproduction quality can be measured; and an adjusting process of obtaining adjustment amount of the reference set value on the basis of the correlation information if the reproduction quality measured in said measuring process is different from the target reproduction quality, and of adjusting the reference set value such that a set value which is adjusted based on the adjustment amount is to be a new reference set value.

11. An information recording/reproducing apparatus comprising:

an information recording apparatus comprising:

a recording device for recording record information onto an information recording medium by irradiating the information recording medium with laser light with a recording power according to a set value;

a calculating device for preparing correlation information which represents a correlation between the set value and reproduction quality, and for obtaining a reference set value which gives target reproduction quality as being desired reproduction quality, by reproducing test-record information recorded with changing the set value;

a measuring device for measuring the reproduction quality, by reproducing the record information recorded by using the reference set value, at least in each information amount in which the reproduction quality can be measured; and an adjusting device for obtaining adjustment amount of the reference set value on the basis of the correlation information if the reproduction quality measured by said measuring device is different from the target reproduction quality, and for adjusting the reference set value such that a set value which is adjusted based on the adjustment amount is to be a new reference set value; and a reproducing device for reproducing the recorded information from said information recording medium.

12. An information recording/reproducing method comprising:

an information recording method comprising:

a recording process of recording record information onto an information recording medium by irradiating the information recording medium with laser light with a recording power according to a set value;

a calculating process of preparing correlation information which represents a correlation between the set value and reproduction quality, and of obtaining a reference set value which gives target reproduction quality as being desired reproduction quality, by reproducing test-record information recorded with changing the set value;

a measuring process of measuring the reproduction quality, by reproducing the record information recorded by using the reference set value, at least in each information amount in which the reproduction quality can be measured; and an adjusting process of obtaining adjustment amount of the reference set value on the basis of the correlation information if the reproduction quality measured in said measuring process is different from the target reproduction quality, and of adjusting the reference set value such that a set value which is adjusted based on the adjustment amount is to be a new reference set value; and a reproducing process of reproducing the recorded information from said information recording medium.

13. A computer program product in a computer-readable medium for tangibly embodying a program of instructions executable by a computer provided for an information recording apparatus, said computer program product making the computer function as at least one portion of a recording device, a calculating detecting device, a measuring device and an adjusting device, said information recording apparatus comprising:

said recording device for recording record information onto an information recording medium by irradiating the information recording medium with laser light with a recording power according to a set value;

said calculating device for preparing correlation information which represents a correlation between the set value and reproduction quality, and for obtaining a reference set value which gives target reproduction quality as being desired reproduction quality, by reproducing test-record information recorded with changing the set value;

said measuring device for measuring the reproduction quality, by reproducing the record information recorded by using the reference set value, at least in each information amount in which the reproduction quality can be measured; and said adjusting device for obtaining adjustment amount of the reference set value on the basis of the correlation information if the reproduction quality measured by said measuring device is different from the target reproduction quality, and for adjusting the reference set value such that a set value which is adjusted based on the adjustment amount is to be a new reference set value.

14. A computer program product in a computer-readable medium for tangibly embodying a program of instructions executable by a computer provided for an information recording/reproducing apparatus, said computer program making the computer function as at least one portion of a recording device, a calculating detecting device, a measuring device, an adjusting device and a reproducing device, said information recording/reproducing apparatus comprising:

an information recording apparatus comprising:

said recording device for recording record information onto an information recording medium by irradiating the information recording medium with laser light with a recording power according to a set value;

said calculating device for preparing correlation information which represents a correlation between the set value and reproduction quality, and for obtaining a reference set value which gives target reproduction quality as being desired reproduction quality, by reproducing test-record information recorded with changing the set value;

said measuring device for measuring the reproduction quality, by reproducing the record information recorded by using the reference set value, at least in each information amount in which the reproduction quality can be measured; and said adjusting device for obtaining adjustment amount of the reference set value on the basis of the correlation information if the reproduction quality measured by said measuring device is different from the target reproduction quality, and for adjusting the reference set value such that a set value which is adjusted based on the adjustment amount is to be a new reference set value; and said reproducing device for reproducing the recorded information from said information recording medium.

* * * * *